(12) United States Patent
Hung et al.

(10) Patent No.: US 8,095,603 B2
(45) Date of Patent: Jan. 10, 2012

(54) EFFICIENT TRANSMISSION OF PRESENCE UPDATE INFORMATION TO PRESENCE SERVICE CLIENTS

(75) Inventors: H. K. Michael Hung, London (CA); Andreea Manolescu, North York (CA); Gerhard Dietrich Klassen, Waterloo (CA)

(73) Assignee: Research In Motion Limited, Waterloo (CA)

( * ) Notice: Subject to any disclaimer, the term of this patent is extended or adjusted under 35 U.S.C. 154(b) by 695 days.

(21) Appl. No.: 11/677,186

(22) Filed: Feb. 21, 2007

(65) Prior Publication Data

US 2008/0201419 A1    Aug. 21, 2008

(51) Int. Cl.
*G06F 15/16* (2006.01)
(52) U.S. Cl. ........................................ 709/206; 709/202
(58) Field of Classification Search ................... 709/206, 709/202
See application file for complete search history.

(56) References Cited

U.S. PATENT DOCUMENTS

| | | | |
|---|---|---|---|
| 7,545,762 B1 * | 6/2009 | McConnell et al. | 370/310.2 |
| 2004/0116137 A1 * | 6/2004 | Bells et al. | 455/466 |
| 2004/0128310 A1 * | 7/2004 | Zmudzinski et al. | 707/102 |
| 2005/0198545 A1 | 9/2005 | Wieck et al. | |
| 2006/0142030 A1 | 6/2006 | Coskun et al. | |
| 2007/0182541 A1 | 8/2007 | Harris et al. | |
| 2007/0233875 A1 * | 10/2007 | Raghav et al. | 709/227 |
| 2007/0249373 A1 * | 10/2007 | Beard et al. | 455/466 |
| 2009/0191851 A1 | 7/2009 | Hutt et al. | |

FOREIGN PATENT DOCUMENTS

| | | |
|---|---|---|
| DE | 10 2004 047689 A1 | 4/2006 |
| EP | 1802080 A1 | 6/2007 |
| WO | WO2005/072494 A2 * | 8/2005 |
| WO | WO 2005/072494 A2 | 8/2005 |

OTHER PUBLICATIONS

Ericsson, Motorola and Nokia, Wireless Village,The Mobile IMPS Initiative, Features and Functions, Version 1.1, 2001-2002.
Ericsson, Motorola and Nokia, Wireless Village,The Mobile IMPS Initiative, Presence Attributes, 1.1, 2001-2002.
European Patent Office, Office Communication, dated Aug. 7, 2008, in relation to EP Patent Application No. 07102806.2-2416, filed Feb. 21, 2007.
English translation of German Patent Application No. DE102004047689 A1, SIEMENS AG, published Apr. 13, 2006.
CIPO: Office Action for Patent Application No. 2622054 dated Apr. 9, 2010 (4 pages).

* cited by examiner

*Primary Examiner* — Kenny Lin
(74) *Attorney, Agent, or Firm* — Jones Day

(57) ABSTRACT

To promote efficient transmission of presence update information to a presence service client associated or integrated with a communication client such as an instant messaging (IM) client, a separate computing device may be notified when the communication client becomes dormant. The separate device may buffer presence updates destined for the communication client, each presence update containing information regarding availability of at least one of a set of contacts for intercommunication via said communication client. When the separate device learns that either the communication client has ceased being dormant or that an event has occurred which shall cause the communication client to cease being dormant, the buffered presence updates may be sent to the presence service client. Presence updates within the buffered set may be reconciled to eliminate obsolete information. The result may be a conservation of wireless connection bandwidth or reduction in device power consumption.

20 Claims, 10 Drawing Sheets

Contact List
71

| # | Contact Name | Login Notification | Status |
|---|---|---|---|
| 1 | Joe | Disabled | Available |
| 2 | Bob | Disabled | Idle |
| 3 | Mary | Disabled | Out to Lunch |
| ⋮ | ⋮ | ⋮ | ⋮ |

FIG. 3

Presence Updates
(Unreconciled)
54

| Time Stamp | Contact Name | Presence Event |
|---|---|---|
| 11:26 AM | Joe | Logged In |
| 11:28 AM | Bob | Logged In |
| 11:48 AM | Bob | Idle |
| 12:00 PM | Mary | Out to Lunch |

FIG. 10

Presence Updates
(Reconciled)
54'

| Time Stamp | Contact Name | Presence Event |
|---|---|---|
| 11:26 AM | Joe | Logged In |
| 11:48 AM | Bob | Idle |
| 12:00 PM | Mary | Out to Lunch |

FIG. 11

EFFICIENT TRANSMISSION OF PRESENCE UPDATE INFORMATION TO PRESENCE SERVICE CLIENTS

FIELD OF TECHNOLOGY

The present disclosure pertains to presence services, and more particularly to the efficient transmission of presence update information to presence service clients.

BACKGROUND

Instant messaging ("IM") is a known form of substantially real-time communication between two or more computing devices that is often based on typed text. The text (and, more recently, other types of data, such as electronic files, streaming content or even voice) is conveyed between the computing devices over a network such as the Internet. Each computing device executes an IM client software application (sometimes referred to simply as an "IM client") associated with an IM service. The IM service defines a protocol for instant messaging which may be proprietary. Popular instant messaging services on the public Internet currently include .NET MESSENGER SERVICE, AOL® INSTANT MESSENGER™ (AIM), EXCITE® PAL, GADU-GADU, GOOGLE TALK™, iCHAT®, ICQ®, JABBER®, QNEXT™, QQ®, SKYPE® and YAHOO!® Messenger. Multi-protocol clients such as GAIM, TRILLIAN™ and Miranda may eliminate or reduce the need for separate client software applications for different IM services. Popular enterprise IM solutions include IBM LOTUS SAMETIME™, NOVELL GROUPWISE® and MICROSOFT® Office Live Communications Server.

Most if not all IM services have an associated presence service. A presence service permits each user to see whether other users in a user-specified set of contacts (commonly known as a "contact list", "buddy list" or "friend list") are currently on-line and available for exchanging instant messages. The availability of each contact may be indicated by way of a presence state indicator such as "available", "busy", "idle", "do not disturb", or "out to lunch" for example, which is displayed by the IM client. Presence information is updated by way of presence updates, which are automatically sent to users who have elected to receive them in respect of a specified set of contacts. A presence service client that is associated with, and in many cases integrated with, the IM client handles presence updates and generally maintains presence state indicators for display to the user, typically by way of the IM client user interface. Presence service clients may also be used in association with other types of communication clients, such as Voice over Internet Protocol (VoIP) clients. When a contact's presence service client detects that the availability of the contact has changed, it automatically reports the changed availability to other users. This is typically done by way of a central server, which in the case of an instant messaging system is a central IM server. Specifically, the report regarding changed status is sent to the central IM server, which in turn reports the changed availability by way of presence updates that are sent to all connected IM users who have elected to receive such updates regarding that contact. A presence update is a communication (e.g. a message) which provides an indication of the current availability of the contact for communication (e.g. instant messaging). Presence services and instant messaging are both described in further detail in "RFC 2778—A Model for Presence and Instant Messaging", which is available at www.ietf.org/rfc2778.txt and is known to those of ordinary skill in the art.

In some cases, the computing device that executes the presence service client is a wireless communication device. For example, an apparatus and method for wireless instant messaging is described in U.S. Patent Publication No. 2006/0142030 A1, which is incorporated by reference hereinto. The IM client software application executing at a wireless communication device may be referred to as a "mobile IM client", and the associated presence service client may be referred to as a "mobile presence service client". Mobile presence service clients may receive presence updates over a wireless connection. If the frequency and number of presence updates is high, as may occur when the number of contacts in the contact list of the wireless communication device user is large, various problems may result. Firstly, a large portion of the wireless connection bandwidth may be consumed by incoming presence updates. Because many wireless service providers charge subscribers based (at least in part) upon the amount of data received, the receipt of frequent and numerous presence updates may disadvantageously increase subscription costs. Secondly, receiving and processing a large number of presence updates may consume a significant amount of power at the wireless communication device, which may in turn undesirably shorten battery life. This may be especially true if each presence update causes the wireless communication device to "awaken" from a power-saving mode and remain in that awakened (non-power-saving) mode for some minimum period of time. Thirdly, because some wireless providers or wireless network types may deem each transmission of one or more presence updates to constitute a "call", any call statistics that are maintained for the device may be significantly skewed by the transmission of frequent individual presence updates. Finally, the frequent transmission of messages containing only one presence update apiece may be inefficient because the overhead associated with each message (e.g. generating, communicating and interpreting header information such as checksums) may be unacceptably high. These shortcomings may be endemic in presence services regardless of whether they are associated with instant messaging or other forms of communication (e.g. VoIP). A solution which mitigates or obviates one or more of these shortcomings would be desirable.

BRIEF DESCRIPTION OF DRAWINGS

In the figures which illustrate example embodiments:

FIG. 3 is a representation of a contact list associated with an mobile IM client software application;

FIG. 10 is a schematic representation of a set of presence updates buffered by a proxy IM server component of the IM system of FIG. 1;

FIG. 11 is a schematic representation of the buffered set of presence updates of FIG. 10 after they have been reconciled.

DETAILED DESCRIPTION

Figure 1:
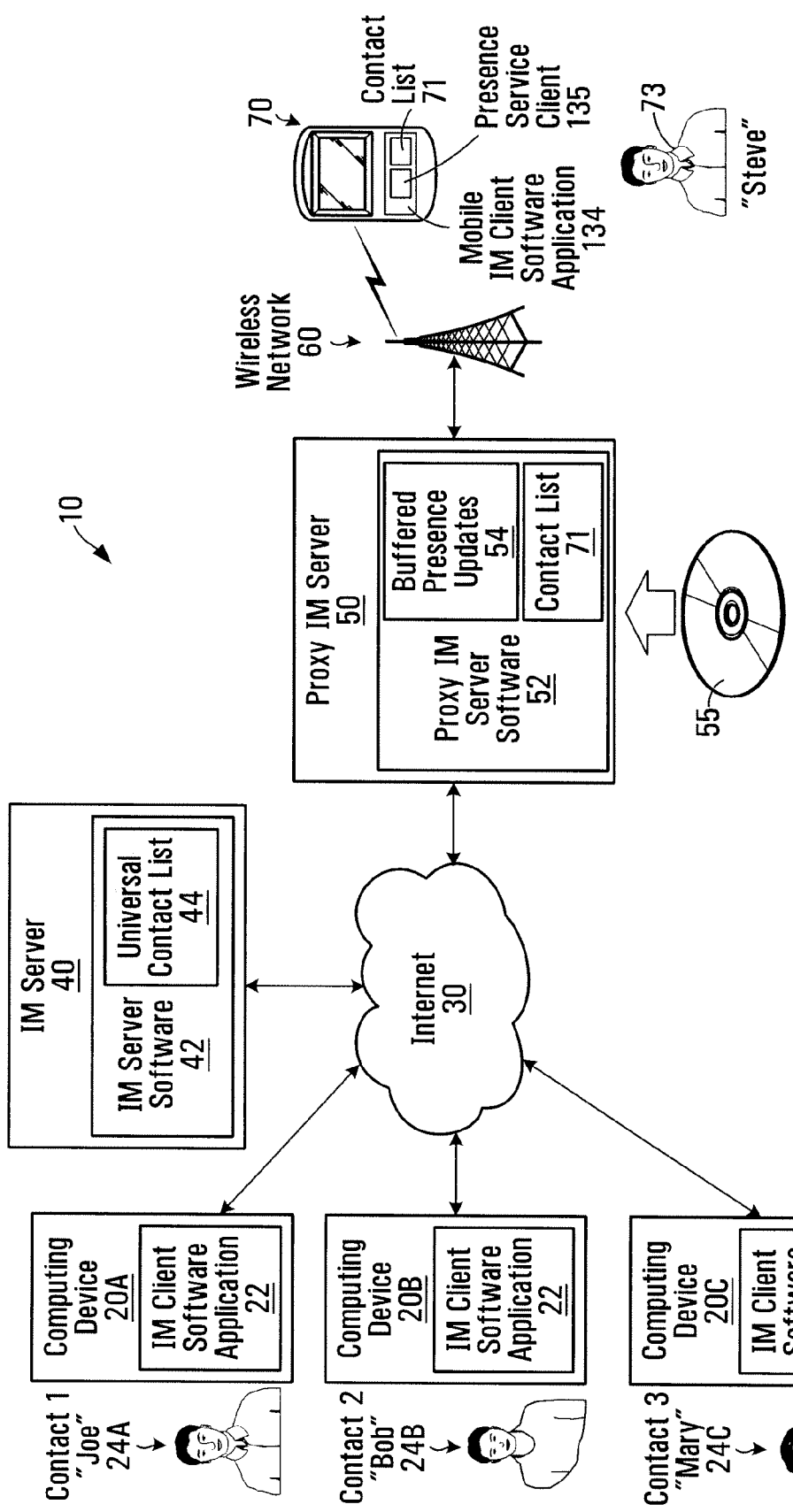
FIG. 1 is a schematic diagram of an IM system with an associated presence service.

In one aspect of the below described embodiment, there is provided a computer-implemented method comprising: receiving an indicator that a communication client executing at or comprising a separate wireless communication device has become dormant; responsive to said receiving, buffering a set of presence updates destined for a presence service client associated with said communication client, each presence update of said set containing information regarding availability of at least one contact of a set of contacts for intercommunication via said communication client; receiving a further indicator indicating either that said communication client has ceased being dormant or that an event has occurred which shall cause said communication client to cease being dormant; and responsive to said receiving of said further indicator, sending said set of presence updates to said presence service client via a wireless connection.

In another aspect of the below described embodiment, there is provided a computing device comprising at least one processor and memory in communication with said at least one processor, said memory storing instructions which, when executed by said at least one processor, adapt said computing device to: receive an indicator that a communication client executing at or comprising a separate wireless communication device has become dormant; responsive to the receipt of said indicator, buffer a set of presence updates destined for a presence service client associated with said communication client, each presence update of said set containing information regarding availability of at least one contact of a set of contacts for intercommunication via said communication client; receive a further indicator indicating either that said communication client has ceased being dormant or that an event has occurred which shall cause said communication client to cease being dormant; and responsive to the receipt of said further indicator, send said set of presence updates to said presence service client via a wireless connection.

In yet another aspect of the below described embodiment, there is provided a machine-readable medium storing instructions which, when executed by at least one processor of a computing device, adapt said computing device to: receive an indicator that a communication client executing at or comprising a separate wireless communication device has become dormant; responsive to the receipt of said indicator, buffer a set of presence updates destined for a presence service client associated with said communication client, each presence update of said set containing information regarding availability of at least one contact of a set of contacts for intercommunication via said communication client; receive a further indicator indicating either that said communication client has ceased being dormant or that an event has occurred which shall cause said communication client to cease being dormant; and responsive to the receipt of said further indicator, send said set of presence updates to said presence service client via a wireless connection.

In yet another aspect of the below described embodiment, there is provided a computer-implemented method comprising, at a wireless communication device: upon detecting that a communication client executing at said wireless communication device has become dormant, said communication client for adapting said device to intercommunicate via a wireless connection with any of a set of user-specified contacts and having an associated presence service client for receiving presence updates via said wireless connection regarding the availability of any of said set of contacts for intercommunication via said communication client, sending a communication for causing said presence updates to be buffered at a separate computing device; and upon detecting that said communication client has ceased being dormant, receiving a set of buffered presence updates at said presence service client from said separate computing device via said wireless connection.

In yet another aspect of the below described embodiment, there is provided a wireless communication device comprising at least one processor and memory in communication with said at least one processor, said memory storing instructions which, when executed by said at least one processor, adapt said device to: upon detecting that a communication client executing at said wireless communication device has become dormant, said communication client for adapting said device to intercommunicate via a wireless connection with any of a set of user-specified contacts and having an associated presence service client for receiving presence updates via said wireless connection regarding the availability of any of said set of contacts for intercommunication via said communication client, send a communication for causing said presence updates to be buffered at a separate computing device; and upon detecting that said communication client has ceased being dormant, receive a set of buffered presence updates at said presence service client from said separate computing device via said wireless connection.

In yet another aspect of the below described embodiment, there is provided a machine-readable medium storing instructions which, when executed by at least one processor of a wireless communication device, adapt said device to: upon detecting that a communication client executing at said wireless communication device has become dormant, said communication client for adapting said device to intercommunicate via a wireless connection with any of a set of user-specified contacts and having an associated presence service client for receiving presence updates via said wireless connection regarding the availability of any of said set of contacts for intercommunication via said communication client, send a communication for causing said presence updates to be buffered at a separate computing device; and upon detecting that said communication client has ceased being dormant, receive a set of buffered presence updates at said presence service client from said separate computing device via said wireless connection.

Referring to FIG. 1, an instant messaging (IM) system 10 is illustrated. The IM system 10 permits users of various types of computing devices connected to the system 10 (through both wired and wireless connections) to exchange textual instant messages by way of an IM service. Although certain aspects of the IM system 10 illustrated in FIG. 1 are conventional, as will be described, the system 10 incorporates a novel capability for efficiently transmitting presence update information to presence service clients.

As illustrated, the IM system 10 includes a number of exemplary computing devices 20A, 20B, 20C and 70 operated by users 24A, 24B, 24C and 73 respectively, as well as a network 30 (which in the illustrated embodiment is the public Internet), an IM server 40, a proxy IM server 50 and a wireless network 60.

Computing devices 20A, 20B and 20C (collectively devices 20 and generically device 20) are conventional computing devices, such as INTEL® or AMD™ processor-based personal computers. Computing devices 20 have various conventional components, such as network interface cards for providing connectivity to the Internet 30 by way of a Digital Subscriber Line (DSL) or cable modem connection for example, input devices such as keyboards and mice for entering data and controlling the operation of the devices 20, display devices such as liquid crystal displays (LCDs) for displaying graphical user interfaces (GUIs) of executing software applications, and volatile and non-volatile memory for storing operating system software and executable software applications along with data (not expressly illustrated).

The memory of each device 20 stores a conventional IM client software application ("IM client") 22. IM client 22 is a computer program that permits a user to engage in instant messaging with other users of a particular IM service (e.g. YAHOO!® MESSENGER, AIM or GOOGLE TALK™) who are also executing compatible IM clients at remote computing devices. The responsibilities of IM client 22 include sending and receiving instant messages at the request of the user and automatically intercommunicating with a central IM server 40 using a service-specific IM protocol to report changes in the availability of the IM client user (the latter possibly being handled by a presence service client integrated with the IM client 22). The IM client 22 may for example be the GOOGLE TALK™ 1.0.0.100 client, YAHOO!® Messenger client with Voice (BETA) (8.0.0.508), Windows Live Messenger 8.0 client, or GAIM 2.0.0 beta 3.1 client.

Although only three computing device 20A, 20B, 20C and three corresponding users 24A, 24B and 24C are illustrated in FIG. 1, it is understood that the number of computing devices and corresponding users may actually be much greater than three, possibly numbering in the hundreds or more.

Computing device 70 is a Research in MOTION LIMITED (RIM) BLACKBERRY™ two-way paging device. The device 70 is a form of wireless communication device, which may alternatively be referred to as a "mobile device" or "mobile station". The device 70 executes a mobile IM client software application ("mobile IM client") 134. Like IM client 22, mobile IM client 134 is a computer program that adapts the device 70 to permit a user 73 to engage in instant messaging with other users of the same IM service. The responsibilities of mobile IM client 134 include sending and receiving instant messages at the request of user 73. The mobile IM client 134 has an integrated presence service client 135 which is responsible for automatically intercommunicating with central IM server 40, using the operative IM protocol, to report changes in the availability of user 73. The presence service client 135 also maintains a user-defined contact list 71 identifying all of the users in IM system 10 with whom user 73 is frequently in contact, as described in more detail below. As will become apparent, the presence service client 135 incorporates program logic which cooperates with program logic at IM proxy server 50 (described below) to support efficient transmission of presence update information to device 70.

IM server 40 is a conventional server executing conventional IM server software 42 with integrated presence service capability. The IM server software 42 effects a public IM service, such as YAHOO!® MESSENGER, AIM, or GOOGLE TALK™, which facilitates instant messaging between IM clients, such as IM clients 22 and mobile IM client 134, executing on various remote computing devices, such as devices 20A, 20B, 20C and 70. The IM service is referred to as a "public" service because it is generally accessible to members of the public who choose to subscribe with the service. This is distinguishable from an enterprise IM service, such as IBM LOTUS SAMETIME™, NOVELL GROUPWISE® and MICROSOFT® Office Live Communications Server, which is typically deployed within a secure corporate network that is not generally accessible to the public. An alternative embodiment which involves an enterprise IM service is described below. The responsibilities of IM server software 42 include registering IM users as they log into (i.e. connect to) the IM service, receiving reports regarding the availability of users as are automatically sent by IM clients 22 and 134, and, responsive to the received reports, sending presence updates regarding changes in user availability to any users who have elected to receive such updates.

The IM server software 42 maintains a universal contact list 44. The universal contact list 44 is an amalgamation of the latest contact list information from each user of the IM service, which in the present example includes IM users 24A, 24B, 24C and 73. The IM server software 42 maintains the universal contact list 44 in order to support its presence service capability. Each time that the IM server software 42 receives a report as to the changed availability of a particular IM user from an IM client 22 or 134 of that user (or associated presence service client), the software 42 consults the list 44 in order to determine which other IM users have expressed an interest in receiving presence updates regarding that IM user. The IM server software 42 then proceeds to send presence updates to those users. In the result, each user is provide with the latest information regarding the availability of IM contacts of interest. The contact list 44 may take the form of a database record or electronic file for example.

Proxy IM server 50 is a conventional server executing proxy IM server software 52. The role of the proxy IM server 50 within IM system 10 is to act as a proxy for IM server 40 from the perspective of wireless communication device 70, and any other wireless communication device in communication with proxy IM server 50 via wireless network 60 (of which none are shown in FIG. 1). The proxy IM server 50 receives IM-related communications destined for IM server 40 from wireless communication device 70. The communications are in the proprietary protocol of the IM service but are carried by one or more underlying transport and network wireless network protocols employed by wireless network 60. For example, the protocols may include a proprietary RIM BlackBerry Instant Messaging (BBIM) protocol encapsulating supported instant messaging functions or a modified, wireless-friendly version of the native Yahoo!® protocol. The proxy IM server 50 in turn relays these communications to the actual IM server 40. To relay the communications, proxy IM server 50 essentially maintains the substance of the communications in the operative IM service protocol but converts the underlying transport and network mechanisms to whatever protocol(s) is/are appropriate for network 30. In the illustrated example, in which network 30 is the public Internet, the latter protocols typically comprise TCP/IP. In the opposite direction, the proxy IM server 50 serves as a proxy for the mobile IM client 134, receiving all IM-related communications destined for wireless communication device 70 and converting underlying protocols in the reverse direction. The types of IM-related communications that may be relayed by proxy IM server 50 include instant messages and presence updates.

Proxy IM server software 52 incorporates program logic that cooperates with program logic at the presence service client 135 to efficiently transmit presence update information to device 70. According to this program logic, the proxy IM server software 52 buffers presence updates destined for the wireless communication device 70 when the IM client software application 134 has become dormant. This buffering results in a buffered set of presence updates 54, which set is shown schematically in FIG. 1. The presence updates 54 are ultimately sent to the wireless communication device, once the mobile IM client software application 134 ceases to be dormant or is about to cease being dormant, as described in more detail below. When the mobile IM client 134 has not been dormant for some time, there may be no set of buffered presence updates 54 at server 50.

Proxy IM server software 52 also stores a contact list for each mobile IM client for which it acts as a proxy. In FIG. 1, only one contact list 71, corresponding to mobile IM client 134 of device 70, is shown. Contact list 71 identifies all of the users of IM system 10 with whom user 73 is frequently in contact. The contact list 71 is generated by user 73 through interaction with the mobile IM client software application 134 and integrated presence service client 135 at device 70, and is automatically communicated by mobile IM client 134 to proxy IM server 50 via wireless network 60. Other contact lists corresponding to other instances of mobile IM client 134 executing at other wireless communication devices in wireless communication with proxy IM server 50 (not illustrated) are omitted for clarity. Contact list 71 is described below in greater detail.

An executable image (i.e. machine-readable instructions) of the proxy IM server software 52 may be loaded from a machine-readable medium 55 into volatile or non-volatile memory of server 50 prior to its execution by server 50. The medium 55 may further include an executable image of mobile IM client software application 134 (including presence service client 135), which may be downloaded to the wireless communication device 70 via wireless network 60 by way of an over-the-air download.

Wireless network 60 is a mobile data communication network, such as the MOBITEX™, Datatac™ or General Packet Radio Service (GPRS) network. Wireless network 60 may be designed to operate with any of a variety of voice communication networks, such as Advanced Mobile Phone Service (AMPS), Time Division Multiple Access (TDMA), Code Division Multiple Access (CDMA), Personal Communication Services (PCS), Global System for Mobile communication (GSM), third generation (3G) wireless or Universal Mobile Telecommunications Standard (UMTS) for example, to support voice communications at the wireless communication device 70. The wireless network 60 effects a wireless connection between proxy IM server 50 and wireless communication device 70. The wireless network 60 could alternatively be a IEEE 802.11 compliant ("WiFi") wireless network, with appropriate changes to the network topology.

Figure 2:
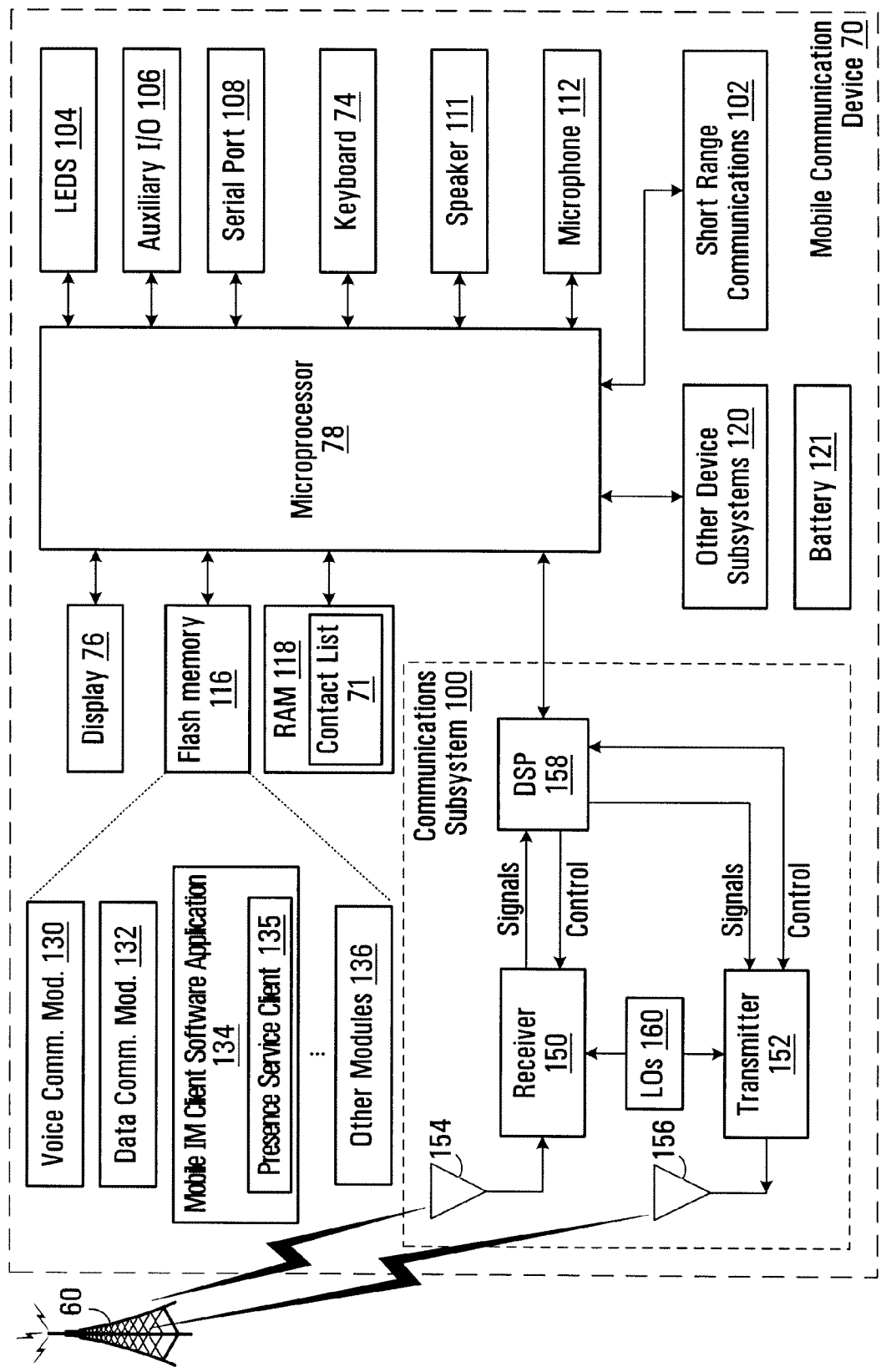
FIG. 2 is a schematic diagram of a wireless communication device component of the IM system of FIG. 1.

Referring to FIG. 2, the wireless communication device 70 of FIG. 1 is illustrated in greater detail. Device 70 is a two-way RF communication device having voice and data communication capabilities. The device 70 includes a housing, a keyboard 74, and a display 76 which may be a color liquid crystal (LCD) display for example. A processor, namely microprocessor 78, is coupled to the keyboard 74 and the display 76. The microprocessor 78 controls the operation of the display 76, as well as the overall operation of the wireless communication device 70, in response to actuation of keys on the keyboard 74 by the user 74 and the receipt of data and/or voice information over wireless network 60. The keyboard may include a mode selection key, or other hardware or software for switching between text entry and telephony entry.

Various other parts of the wireless communication device 70 are shown schematically in FIG. 2. These include: a communications subsystem 100; a short-range communications subsystem 102; a set of auxiliary I/O devices 106; a serial port 108; a speaker 111; a microphone 112; as well as memory devices including a flash memory 116 and a Random Access Memory (RAM) 118; and various other device subsystems 120. The device 70 may have a battery 121 to power the active elements of the device. In the present embodiment, the wireless communication device 70 includes voice communication capabilities. However, voice communication capabilities may not be present in alternative embodiments.

The processor 78 executes operating system software (not expressly illustrated) which may be stored in a persistent store, such as the flash memory 116, or may be stored in other types of computer-readable memory devices, such as a read only memory (ROM—not expressly illustrated) or other storage media. The operating system of the present embodiment is a proprietary, multitasking operating system designed by Research In Motion Limited (RIM) that is capable of switching between multiple, concurrently executing software applications. At any given time, one application is executed as a foreground process while one or more applications may be executed as background processes. A user 73 interacting with the device 70 may cause the operating system to change an application from executing as a background process to executing as a foreground process (and vice-versa) in a manner that is known in the art. As applications are executed, they may be temporarily loaded, in whole or in part, into a volatile store, such as RAM 118. Communication signals received by the wireless communication device may also be stored in RAM 118.

Flash memory 116 stores various software applications 130, 132 and 134 that may be executed by processor 78. A predetermined set of applications that control basic device operations, such as voice and data communications 130 and 132, may be installed during manufacture of the device 70. Other applications may be installed either during manufacture or subsequently. These other applications include mobile IM client software application 134 and integrated presence service client 135, which is a focus of the present disclosure and is described in more detail below. Flash memory 116 may further contain a number of other software modules 136. Each module 136 may have an associated icon that is presented by the operating system on a home screen (this is also true for mobile IM client 134). The set of icons may be referred to as a "ribbon". User selection of an icon from the ribbon may cause the corresponding module 136 (or client 134) to be invoked.

RAM 118 stores contact list 71. As noted above, contact list 71 is a list generated by user 73 identifying all of the users of IM system 10 with whom the user is frequently in contact. The list 71 may be a data record, electronic file or other data representation. Although list 71 is illustrated separately from IM client software application 134 in FIG. 2, it will be appreciated that the list 71 may form part of application 134 within RAM 118, where the application 134 may also be stored during its execution. Contact list 71 is shown in FIG. 3 in greater detail.

Referring to FIG. 3, contact list 71 is represented as a table. Each row of the table represents a single IM contact. For brevity, only three IM contacts are represented in FIG. 3; the actual number of represented IM contacts may be greater than three. Each contact is identified in the "Contact Name" column by the IM username of the contact. In the illustrated example, the usernames "Joe", "Bob" and "Mary" in rows 1, 2 and 3 of the table represent users 24A, 24B and 24C respectively of FIG. 1. The "Login Notification" column indicates the preference of user 73 for receiving immediate login notification in respect of the IM contact represented by the row. A value of "enabled" in that column indicates that user 73 wishes to be notified immediately when the contact logs in, which in turn indicates that proxy IM server 50 should not buffer presence updates for this contact. A value of "disabled" indicates that no such notification is desired, and that presence updates can be buffered accordingly. The "Status" column represents the current presence status of the contact (i.e. the availability of the contact for instant messaging), as determined from presence updates received in respect of the contact. In illustrated example, the statuses indicate that user "Joe" is available for instant messaging; user "Bob" is idle; and user "Mary" is out to lunch. The status for "Joe" and "Bob" may be reported by their respective IM clients 22 of these users based on automatically detected activity or inactivity of these IM clients 22; in contrast, the status for "Mary" may be manually set by that user. For clarity, the term "login notification" refers to a change in presence from "offline" to any "non-offline" status. For example, if a user logs in with a status of "invisible" (as permitted in some networks), this may constitute a login notification.

Referring back to FIG. 2, communication functions, including data and voice communications, are performed by device 70 through the communication subsystem 100, and possibly through the short-range communications subsystem 102. The communication subsystem 100 includes a receiver 150, a transmitter 152, and one or more antennas 154 and 156. In addition, the communication subsystem 100 also includes a processing module, such as a digital signal processor (DSP) 158, and local oscillators (LOs) 160. The specific design and implementation of the communication subsystem 100 is dependent upon the communication network in which the wireless communication device 70 is intended to operate. For example, the communication subsystem 100 of the wireless communication device 70 may be designed to operate with the MOBITEX™, Datatac™ or GPRS mobile data communication networks and may also be designed to operate with any of a variety of voice communication networks, such as AMPS, TDMA, CDMA, PCS, GSM, WiFi, 3G wireless and/or UMTS. Other types of data and voice networks, both separate and integrated, may also be utilized with the wireless communication device 70.

Network access requirements vary depending upon the type of communication system. For example, in the MOBITEX™ and Datatac™ networks, wireless communication devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the wireless communication device 70 may send and receive communication signals over the communication network 60. Signals received from the communication network 60 by the antenna 154 are routed to the receiver 150, which provides for signal amplification, frequency down conversion, filtering, channel selection, etc., and may also provide analog-to-digital conversion. Analog-to-digital conversion of the received signal allows the DSP 158 to perform more complex communication functions, such as demodulation and decoding. In a similar manner, signals to be transmitted to the network 60 are processed (e.g. modulated and encoded) by the DSP 158 and are then provided to the transmitter 152 for digital-to-analog conversion, frequency up conversion, filtering, amplification and transmission to the communication network 60 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as an instant message, text message or web page download, is processed by the communication subsystem 100 and is input to the microprocessor 78. The received signal is then further processed by the microprocessor 78 for output to the display 76, e.g. in accordance with an executing software application or module, or alternatively to some other auxiliary I/O devices 106. A device user may also compose data items, such as instant messages or email messages, using the keyboard 74 and/or some other auxiliary I/O device 106, such as a touchpad, a trackball, rocker switch, a thumb-wheel, or some other type of input device. The composed data items may then be transmitted over the communication network 60 via the communication subsystem 100. Instant message data communication by the device 70 is described in more detail below.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the device 70. In addition, the display 76 may also be utilized in voice communication mode, for example to display the identity of a calling party, the duration of a voice call, or other voice call related information.

The short-range communications subsystem 102 enables communication between the wireless communication device 70 and other proximate systems or devices, which need not necessarily be similar devices. For example, the short-range communications subsystem may include an infrared device and associated circuits and components, or a Bluetooth™ communication module to provide for communication with similarly-enabled systems and devices.

Figure 4:
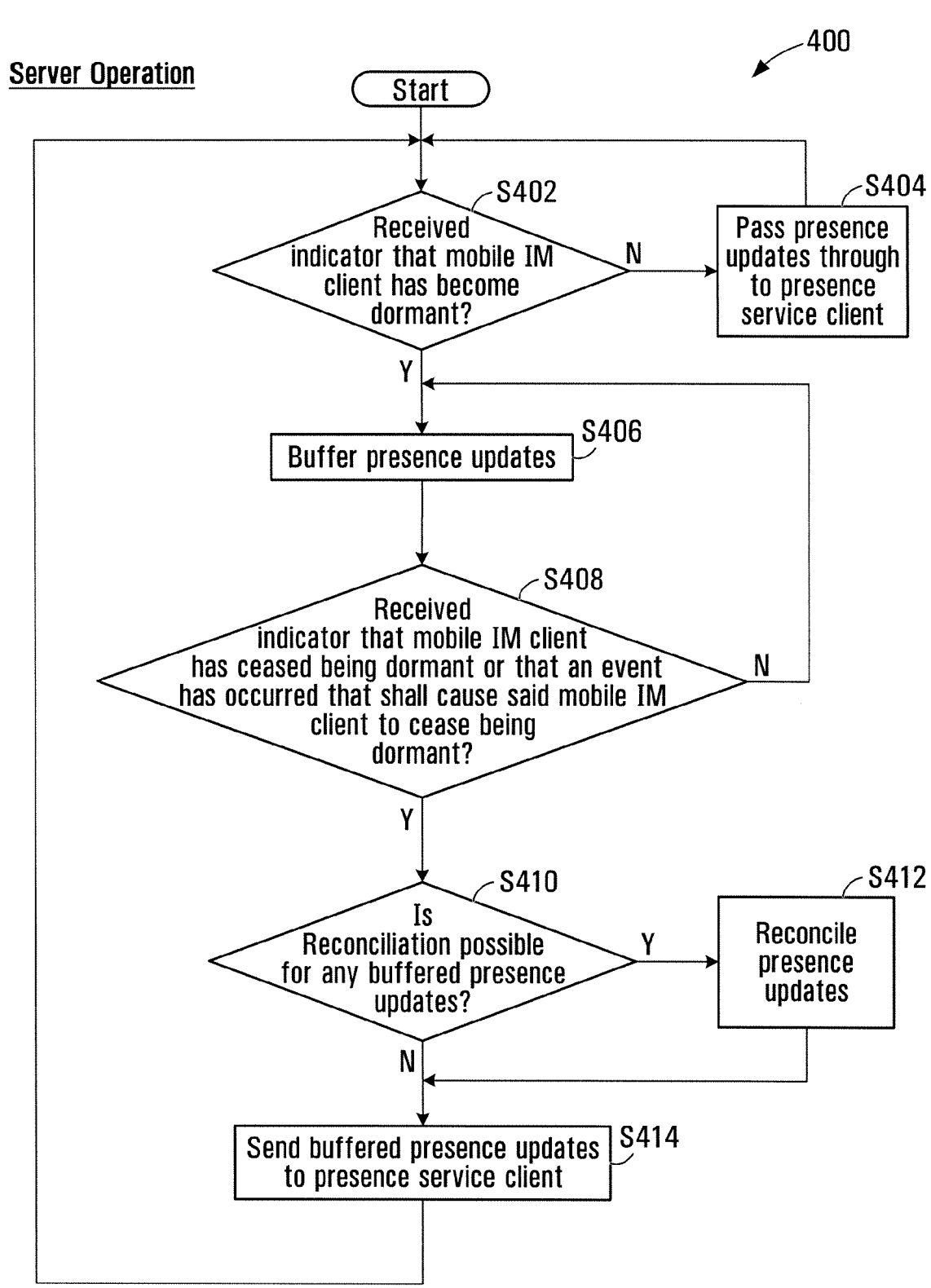
FIG. 4 is a flowchart illustrating operation a proxy IM server software component of the IM system of FIG. 1.
Figure 5:
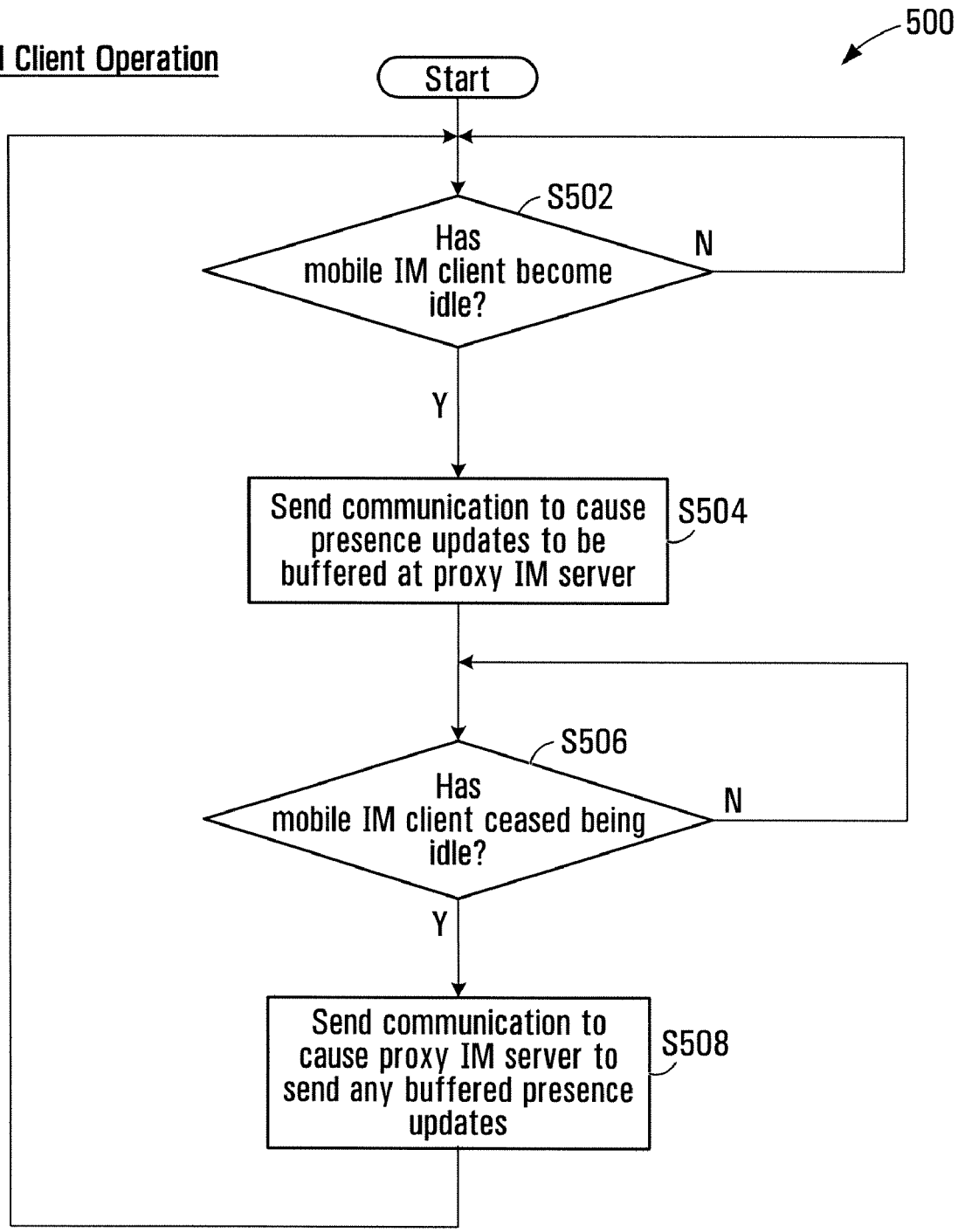
FIG. 5 is a flowchart illustrating operation of a mobile IM client software application component of the IM system of FIG. 1.
Figure 6:
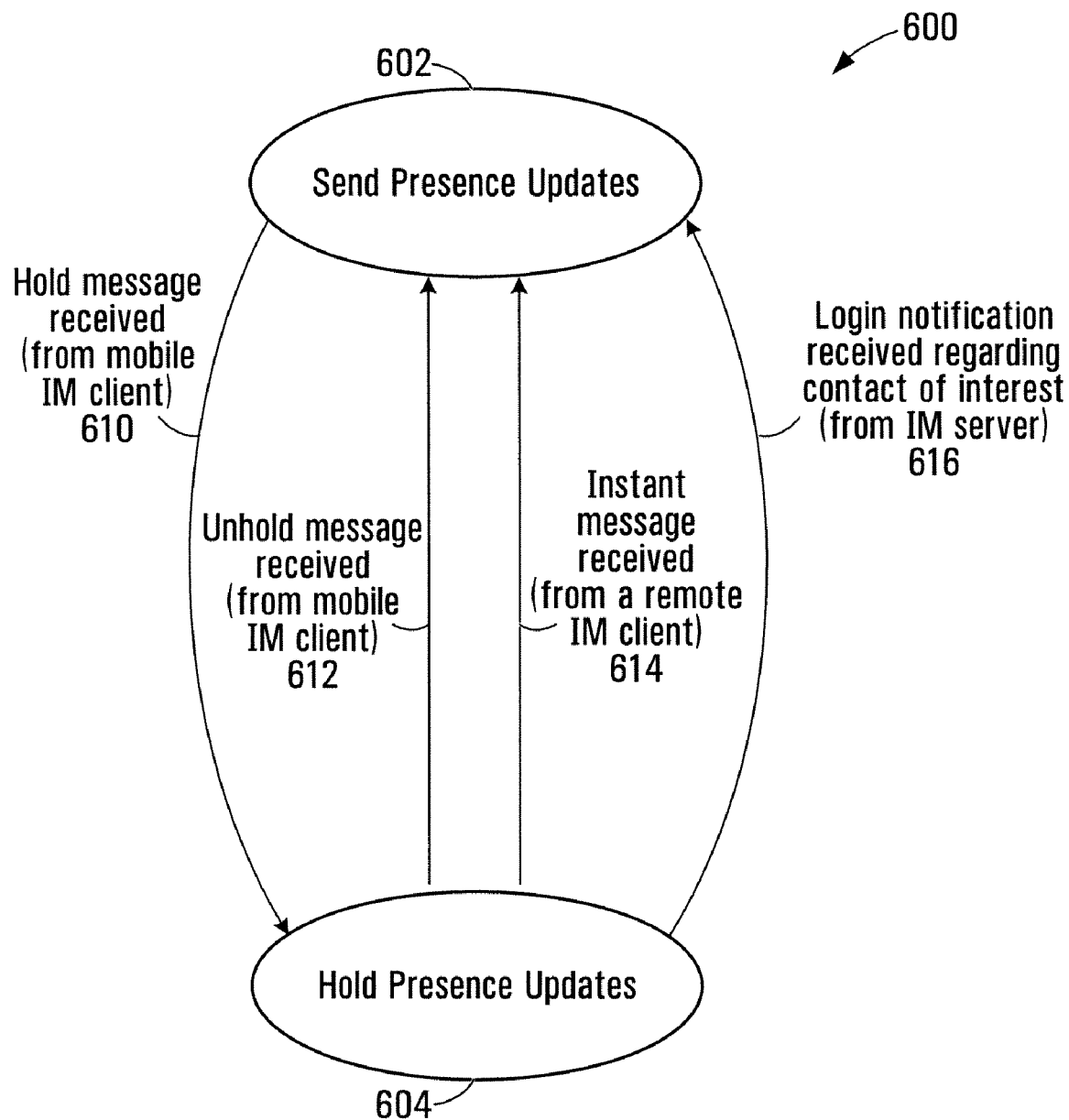
FIG. 6 is a state machine effected by the proxy IM server software whose operation is illustrated in FIG. 4.
Figure 7:
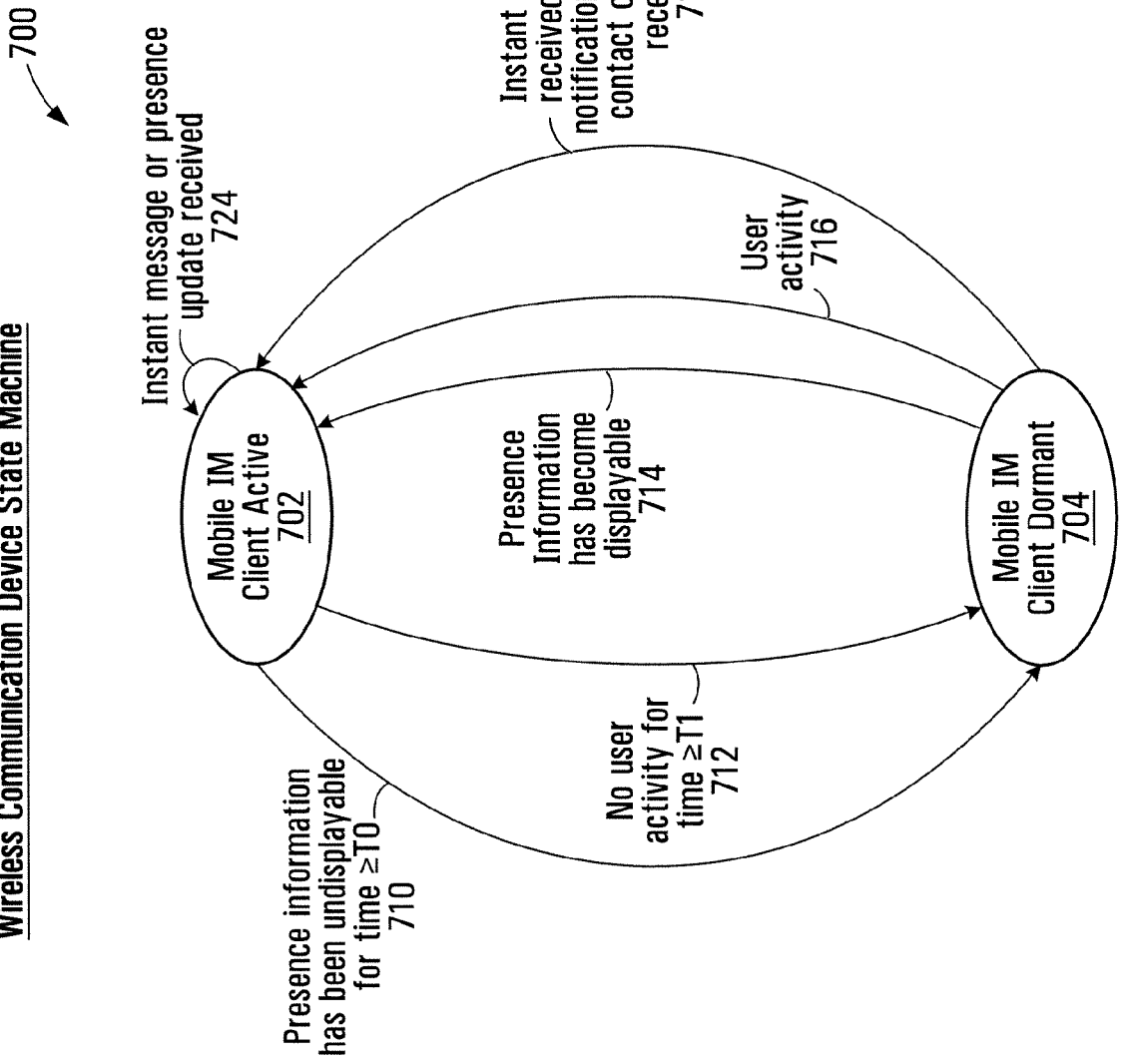
FIG. 7 is a state machine effected by the mobile IM client software application whose operation is illustrated in FIG. 5.

Operation of the illustrated embodiment for efficiently communicating presence update information to presence service clients is shown in FIGS. 4-11. FIGS. 4 and 5 are flowcharts illustrating operation 400 of the proxy IM server software 52 and operation 500 of the mobile IM client software application 134 respectively. FIGS. 6 and 7 illustrate state machines 600 and 700 effected by the proxy IM server software 52 and wireless communication device 70 during the course of operation 400 and 500 respectively. With respect to FIG. 4, it should be appreciated that the illustrated operation 400 is in respect of a single IM client 134, and that the proxy IM server software 52 may be capable of performing operation 400 in respect of multiple supported IM clients simultaneously. It should also be appreciated that operation of proxy IM server software 52 for handling various other types of IM-related messages (e.g. instant messages, which may be received at irregular intervals) is omitted from FIG. 4 for clarity. With respect to FIG. 5, it will be appreciated that the illustrated operation may be implemented by a presence service client 135.

It is initially assumed that users 24A, 24B, 24C and 73 have used their IM clients 22 or 134 to specify IM usernames of "Joe", "Bob", "Mary" and "Steve" (respectively) by which they shall be known to other users of the IM service, as indicated in FIG. 1. It is also assumed that, when operation commences, say at time 11:15 AM, only users 24C ("Mary") and 73 ("Steve") have invoked their IM clients 22 and 134 respectively and logged into the IM service. The IM status of both users is initially "Available". Moreover, it is assumed that user 73 has listed users Joe, Bob and Mary in his contact list 71 and has disabled login notification in respect of these users, as shown in FIG. 3.

In the description of operation below, the following definitions will be used:

(1) User activity: At wireless communication device 70, any manipulation of keyboard 74 or other input device of auxiliary I/O devices 106 (e.g. a touchscreen, trackball, thumb-wheel, or mouse) when the device 70 is not in a key-locked state or password-locked state (as defined below) is considered to constitute user activity. When the device 70 is in a key-locked or password-locked state, any such manipulation—including manipulation for entering a password or for attempting to unlock the device (i.e. to remove the device from a key-locked state or a password-locked state)—is not considered to constitute user activity. User activity with respect to a software application means user activity detected by an executing software application, and may be referred to as user interaction with the software application.

(2) Key-locked: The device 70 is considered to be in a key-locked or "hold" state when the device 70 rejects all input except a pre-defined unlock combination which removes the device 70 from the key-locked state. The purpose of this state is to effectively "lock the keys" of the device 70 (i.e. make the buttons or other input mechanisms inoperative) to avoid the accidental generation of spurious input, as may occur if buttons are inadvertently depressed when the device 70 in a pocket of the user's clothing or in a purse. The device may be placed into a key-locked state by manipulation of an electro-mechanical input mechanism or control, such as a slide switch which resists inadvertent depression, or automatically after the passage of a predetermine time period with no user activity. The device may be removed from the key-locked state by entry of the pre-defined unlock combination, which may be a complementary manipulation of a control (e.g. sliding the slide-switch in an opposite direction to that which caused the device to become key-locked). In the case of the BlackBerry device, key locking may only be available if password locking (described below) is disabled. To key-lock the BlackBerry device, a GUI control is selected. To unlock a BlackBerry device, the thumb-wheel is depressed twice in succession. Depending upon the type and manufacturer of the wireless communication device 70, application data may or may not be visible when a device is key-locked. For example, BlackBerry devices do not show any application data when key-locked. Accordingly, the key-locked state for a BlackBerry device is almost the same as the password-locked state (defined below), except that password entry is not required for unlocking the device. This is not necessarily true for other types of wireless communication devices.

(3) Password-locked: The device 70 is considered to be in a password-locked state when a password must be entered in order to access the device. The device may be placed into a password-locked state at the user's initiation (e.g. through selection of a GUI control) or automatically, upon detecting that the device has been placed into a holster or detecting the passage of a predetermine time period with no user activity. When in this state, no application data (including presence information, in the case of the IM client software application 134) is presented on a display of the device until the correct password is entered.

(4) Presence Information Displayable: Presence information is considered to be displayable by an IM client software application 134 or presence service client 135 at wireless communication device 70 when the device 70 is capable of presenting current IM contact presence information on display 76 substantially in real time. In the case of the BlackBerry device, this occurs when: (a) the IM client software application 134 is executing in the foreground; (b) the device is not key-locked; and (c) the device is not password-locked. At other types of wireless communication devices, the set of conditions to be met in order for presence information to be considered to be displayable may be different. For example, some devices may be capable of being in the "presence information displayable" state even when key-locked, if they continue to display current application data while key-locked. In another example, an IM client software application GUI may be minimized and thus may not be considered to be "in the foreground" in a conventional sense, but may continue to display at least some current presence information, e.g. within an icon in a "system tray" or similar GUI construct, in which case presence information may still be considered to be displayable.

(5) Presence Information Undisplayable: Presence information is considered to be undisplayable by an IM client software application at wireless communication device 70 when the device 70 does not present current IM contact presence information from the application on display 76 substantially in real time. In the case of a BlackBerry device, this may be for failure of the device to meet each of conditions (a), (b) and (c) described above. In some wireless communication device embodiments, the "presence information undisplayable" state may also be entered either when the device display has been placed into a power-saving mode or when a screen saver has been activated—each of these situations preventing current IM presence information from being seen by the user.

Referring to FIG. 6, at the proxy IM server 50, the initial state effected by the proxy IM server software 52 is the SEND PRESENCE UPDATES state 602. In this state, any presence updates received by the proxy IM server software 52 from IM server 40 in respect of any of users Joe, Bob and Mary are sent (relayed) to the mobile IM client software application 134 and integrated presence service client 135 via wireless network 60. Thus, for example, if user Mary temporarily sets her status (manually) to "do not disturb" at 11:16 AM and then manually reverts her status to "available" at 11:17 AM by interacting with her client 22 at computing device 20C (FIG. 1), two presence updates reflecting these changes in availability would be received from IM server 40 substantially in real time and relayed to mobile IM client 134/presence service client 135 via wireless network 60. This is represented in FIG. 4 by operation S402 and S404.

At wireless communication device 70, it is assumed that, from 11:15 AM onward, device 70 is neither key-locked nor password-locked and mobile IM client 134 executes as a foreground process. Referring to FIG. 7, the initial state effected by the wireless communication device 70 is accordingly the MOBILE IM CLIENT ACTIVE state 702. In that state, any presence updates received from proxy IM server software 52 (such as the two mentioned above) are processed by the presence service client 135 of mobile IM client 134, with any changes in availability being reflected (substantially in real time) in a GUI representation of the contact list that is displayed on the display 76 of device 70. The receipt of such presence updates does not result in a state change in state machine 700 and is thus represented as a transition 724 from state 702 back to state 702. The same transition 724 occurs when instant messages are received in state 702.

It is assumed that, at 11:25 AM, the mobile IM client software application 134 becomes "dormant". This can occur in one of two ways. First, presence information may become undisplayable (as described above) and remain undisplayable for a predetermined period of time T0, which may be 5 minutes for example (FIG. 7, transition 710). Presence information could become undisplayable if one of conditions (a), (b) or (c) described above ceases to be met. For example, condition (a) could cease to be met if the user 73 causes mobile IM client 134 to execute as a background process by executing a distinct application in the foreground (e.g. an email application) for time period T0. The user may decide to use the distinct application without terminating the IM client software application 134 based on his knowledge that, if IM client software application 134 receives an instant message while the distinct application is being used, the device 70 will generate a notification tone or otherwise notify the user of the instant message, so that the user can elect to switch back to the IM application if desired. The rationale for requiring presence information to remain undisplayed for at least time period T0 is described below. Second, there may be an absence of user interaction with IM client software application 134 for a time period of at least T1 (FIG. 7, transition 712). The rationale for requiring the lack of user activity to be at least time period T1 in duration is described below. In either case, the software application 134 transitions to a new MOBILE IM CLIENT DORMANT state 704.

Figure 8:
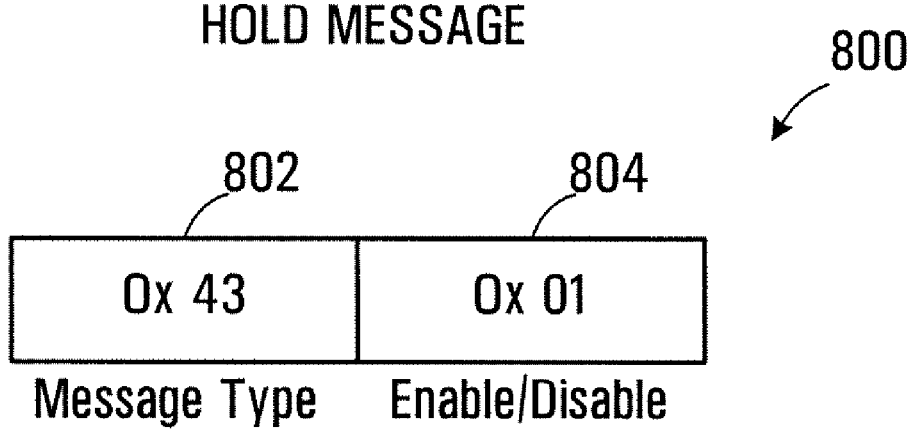
FIGS. 8 and 9 illustrate the format of two types of messages sent by the wireless communication device component of the IM system of FIG. 1.

Referring to FIG. 5, which shows operation of IM client software application 134 with integrated presence service client 135, the determination in S502 is accordingly made in the positive. As a result, a communication is sent to the proxy IM server software 52 to cause it to commence buffering presence updates destined for device 70 (FIG. 5, S504). In the present embodiment, the communication takes the form of a HOLD message 800, whose format is illustrated in FIG. 8. As shown in FIG. 8, the HOLD message 800 has a message type field 802 and an enable/disable field 804, which are each one byte in length in the present embodiment. The value 0x43 in the message type field 802 indicates that the message pertains to the scheme for efficient transmission of presence update information described herein. The value 0x01 in the message type field 804 indicates "enable", i.e. hold presence update messages.

The HOLD message 800 is received by the proxy IM server software 52 shortly after it is sent, resulting in a transition 610 of the state machine 600 from the SEND PRESENCE UPDATES state 602 to a HOLD PRESENCE UPDATES state 604 (FIG. 6). The HOLD message 800 serves as an indicator that the mobile IM client 134 has become dormant (FIG. 4, S402). As a result, the proxy IM server software 52 begins to buffer any presence updates destined for mobile IM client 134 (S406).

Over the next forty minutes, it is assumed that four presence updates regarding users Joe, Bob and Mary are received by proxy IM server software 52 and are buffered. The buffered set of presence updates 54 is illustrated as a table in FIG. 10.

Referring to FIG. 10, each presence update is represented as a row within the table. For each presence update, time stamp information, contact name information, and presence event information is represented. The time stamp information indicates the time at which the presence update was received. The contact name information indicates the IM username of the contact in respect of which the presence update was sent. The presence event information indicates the event that has occurred which impacts upon the availability of the contact for instant messaging. Thus, as shown in FIG. 10, at 11:26 AM and 11:28 AM respectively, users Joe and Bob used their IM clients 22 to log into the IM service. At 11:48 AM, Bob's IM client reported a status of "idle", which resulted from a failure of user Bob to interact with his IM client 22 for some predetermined time period (such as 10 minutes for example).

Then, at 12:00 PM, user Mary manually set her own status to "out to lunch" to let others know that she will be unavailable.

Subsequently, an event occurs at wireless communication device 70 which results in the mobile IM client 134 ceasing to be dormant. The event may be one of: presence information once again becoming displayable (FIG. 7, transition 714—this assumes that transition 710 had been the reason that the IM client software application 134 was in state 704); user interaction with IM client software application 134 (FIG. 7, transition 716—this assumes that transition 712 had been the reason that the IM client software application 134 was in state 704); or the receipt by mobile IM client software application 134 of either of an instant message from another IM user or a login notification regarding an IM contact of interest (FIG. 7, transition 718), either of which may cause a notification (e.g. tone or vibration) to be generated by the device 70. In the case of transition 714, the event which causes the transition may for example be user entry of a password to cause the device to exit a password-lock state or user manipulation of a device control to cause the device to exit a key-lock state, followed by user interaction with IM client 134.

It will be appreciated that the transition 718 differs from the transitions 714 and 716 because it is based on a condition (i.e. the receipt of an instant message or login notification) that is known to proxy IM server software 52 before it is known to IM client 34 (since the instant message or login notification will have come from IM proxy server software 52). For this reason, when transition 718 occurs, it may be said that the Proxy IM server software 52 has "taken the IM client 134 out of the dormant mode". This is in contrast to the IM client 134 "taking itself out of dormant mode" based on conditions known locally to IM client 134 but not known to the Proxy IM server 50 (as for transitions 714 and 716).

Regardless of which of transitions 714, 716 and 718 occurred, the software application 134 will have transitioned from the MOBILE IM CLIENT DORMANT state 704 back to the MOBILE IM CLIENT ACTIVE state 702. It will be appreciated that entering back into the MOBILE IM CLIENT ACTIVE state 702 does not necessarily mean that presence information has once again become displayable (assuming transition 710 had been the reason for the state machine 700 being in state 704). For example, if an instant message has been received at the IM client 134 but the device 70 remains password-locked, state machine 700 could be in state 702 despite the fact that presence information remains undisplayable.

Figure 9:
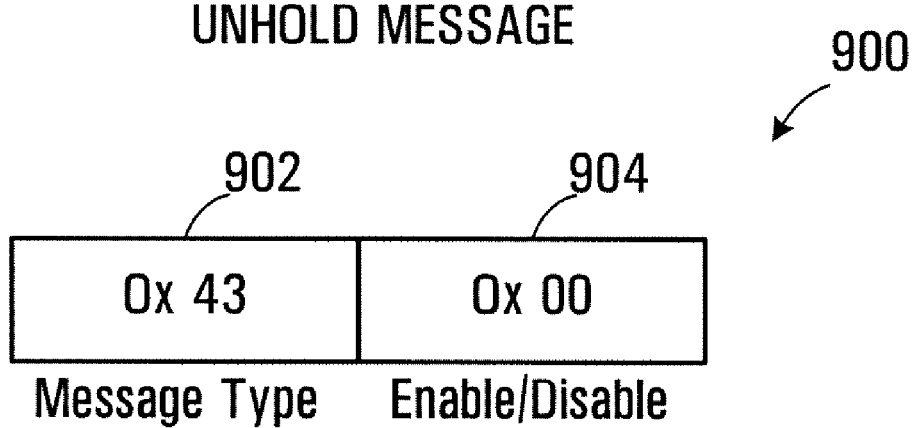

The transitions 714 and 716 to MOBILE IM CLIENT ACTIVE state 702 reflect the fact that the mobile IM client 134 has ceased being dormant. This is detected at S506 (FIG. 5). Accordingly, when either of transitions 714 or 716 into state 702 occurs, a communication is sent from device 70 to cause the proxy IM server software 52 to send any buffered presence updates to presence service client 135 (FIG. 5, S508). In the present embodiment, the communication takes the form of an UNHOLD message 900, whose format is illustrated in FIG. 9. As shown in FIG. 9, the UNHOLD message 900 has the same format as the HOLD message 800 of FIG. 8, with a message type field 902 and a enable/disable field 904, each being one byte in length. The same value 0x43 appears in the message type field 902 as in message type field 802, whereas the value 0x00 in the message type field 804 indicates "disable", i.e. unhold presence update messages.

Referring to FIG. 4, the UNHOLD message 900 is received by proxy IM server software 52 and serves as an indicator that the mobile IM client 134 has ceased being dormant (S408). This triggers a transition 612 of the state machine 600 from the HOLD PRESENCE UPDATES state 604 back to the SEND PRESENCE UPDATES state 602 (FIG. 6).

Referring again to FIG. 7, it should be appreciated that transition 718 does not cause an UNHOLD message to be sent from device 70 to Proxy IM server 50 (unlike transitions 714 and 716). This is to avoid unnecessary message traffic and thereby conserve bandwidth. The UNHOLD message is unnecessary because the proxy IM server software 52 will be aware of either of the events that cause transition 718—i.e. receipt of an instant message or login notification—even before IM client software application 134 is aware of them, given that it relays such communications to the device 70 where application 134 executes. Accordingly, when either of an instant message or login notification are received by proxy IM server software 52, this serves as an indication that the IM client software application 134 will cease being dormant in the near future, after the proxy IM server software 52 relays the communication to application 134 so as to cause transition 718 of FIG. 7. More specifically, referring to FIG. 6, if an instant message destined for mobile IM client 134 is received at proxy IM server software 52 (e.g. from an IM client 22 at another computing device 20), then state machine 600 will transition 614 from the HOLD PRESENCE UPDATES state 604 to the SEND PRESENCE UPDATES state 602. Similarly, if a login notification is received regarding a contact of interest (e.g. a user named in the contact list 71 of user 73), transition 616 from state 604 to state 606 will occur. Thus, buffered presence updates are sent to the mobile IM client software application 134 despite the fact that application 134 did not send an UNHOLD message to proxy IM server software 52.

Subsequently, the proxy IM server software 52 undertakes processing for sending the buffered presence updates 54 (FIG. 10) to the presence service client 135. Referring to FIG. 4, a determination is initially made as to whether it is possible to reconcile any presence updates within the buffered set 54 (S410). Reconciliation may be possible when two or more presence updates can be combined into a single presence update in which obsolete presence information is omitted. For example, referring to FIG. 10, it may be determined that the "logged in" presence update for user Bob received at 11:28 AM is obsolete in view of the later presence update for user Bob received at 11:48 AM indicating that user Bob is "idle" (since the latter status inherently indicates that Bob has logged in). As a result, the two presence updates may be reconciled (S412) by removing the former presence update from the set 54. This creates a new, reconciled set of presence updates 54', as shown in FIG. 11. Advantageously, the size of the set 54' is smaller than that of original set 54'. This reduces the amount of bandwidth used when the set 54' is sent to the mobile IM client software application 134 at device 70 (S414, FIG. 4). Moreover, to the extent that the reconciled presence updates can all be transmitted in a single "burst", efficiency may be improved in comparison to the transmission of presence updates individually. Greater efficiency may result for devices that are programmed to "awaken" from a power-saving mode and remain in that awakened (non-power-saving) mode for some minimum period of time each time that a presence update is received, because the device may spend less time overall in the awakened state when presence updates arrive in bursts. Efficiency may also be improved when multiple presence updates are transmitted by way of a single message, in which case the overhead associated with each presence update may be reduced as compared with the transmission of each presence update in a separate message. Moreover, in wireless networks which employ message compression, the degree of compression attainable when multiple presence updates are sent in one message may be higher than that achievable when the presence updates are transmitted individually, since compression may be more effective for larger message sizes. As well, the accuracy of call statistics maintained by wireless providers or wireless networks that deem each transmission of one or more presence updates to constitute a "call" may be improved. Another example of reconciliation may occur for IM clients that are capable of indicating the current song to which an IM contact is listening, wherein presence updates regarding previously heard songs are omitted.

Subsequently, operation 400 and 500 of FIGS. 4 and 5, and the transitions of state machines 600 and 700, repeat as necessary as the mobile IM client software application 134 becomes dormant and ceases to be dormant over time.

It will be appreciated from the above description that, for each transition into the MOBILE IM CLIENT ACTIVE state 702, the state machine 700 remains in that state for at least time T0 or T1. This is done intentionally, to ensure that once mobile IM client 134 ceases to be dormant, it will spend at least time T0 or T1 in a non-dormant state (i.e. state 702). If this were not done, and if one of the conditions which otherwise causes transition 710 or 712 is already present when the state machine transitions into state 702, then the result would be an immediate transition back to the MOBILE IM CLIENT DORMANT state 704. Since transitioning into the MOBILE IM CLIENT ACTIVE state 702 causes the transmission of an UNHOLD message 900 to the software 52 (at least in the case of transitions 714 and 716) and transitioning back into the MOBILE IM CLIENT DORMANT state 704 causes transmission of a HOLD message 800 from device 70 to the proxy IM server software 52, such rapid transitions may result in an unnecessary flurry of communications between the wireless communication device 70 and proxy IM server 50. Requiring the state machine 700 to stay in state 702 for at least time T0 or T1 serves to mitigate this eventuality. Put another way, if a user has received an instant message recently, the user may be likely to receive another instant message again soon. Thus it is desirable to prevent a transition back into state 704 too soon, even if the user has, e.g., placed the application into the background or password-locked (or key-locked) the device. Of course, for some embodiments, or in certain situations, it may be determined that the additional message traffic is acceptable. In that case, the minimum time period durations may be reduced or, in the case of T0, avoided altogether. The use of two time periods T0 and T1 permits flexibility in configuring system behavior. In some embodiments, this flexibility may not be required, such that only one time period may be used for both transitions (which is what effectively occurs if time periods T0 and T1 are both set to the same duration).

In the above-described embodiment, the proxy IM server 50 upon which proxy IM server software 52 is executed may send IM message traffic to wireless communication device 70 by way of a relay server that stores and forwards communications (not only instant messages, but other communications such as email for example) that are destined for wireless communication device 70. In a conventional configuration, the relay server may be situated between the proxy IM server 50 and wireless network 60 of FIG. 1. The relay server may thus serve as a "choke point" for communications, including IM communications, destined for the wireless communication device 70. By implementing the proxy IM server software 52 in such a manner, the capability for buffering presence updates may conveniently be provided at the server 52, either for a single IM service or for more than one IM service, since all IM-related communications to and from wireless communication device 70 will be routed though the relay server. Moreover, because no modification of the IM server software 42 is required, the capability can be effected by an entity other than the IM service provider. Of course, such implementation is not required. For example, the proxy server capability that is described above in conjunction with FIGS. 4 and 6 could be effected at the IM server 40 in an alternative embodiment.

In another alternative, when an enterprise IM server is used to provide IM service to users connected to a secure corporate network within an enterprise, the proxy server capability described above in conjunction with FIGS. 4 and 6 may be effected on a server connected to the corporate network, rather than at a relay server. An alternative embodiment illustrating this possibility is shown schematically in FIG. 12.

Figure 12:
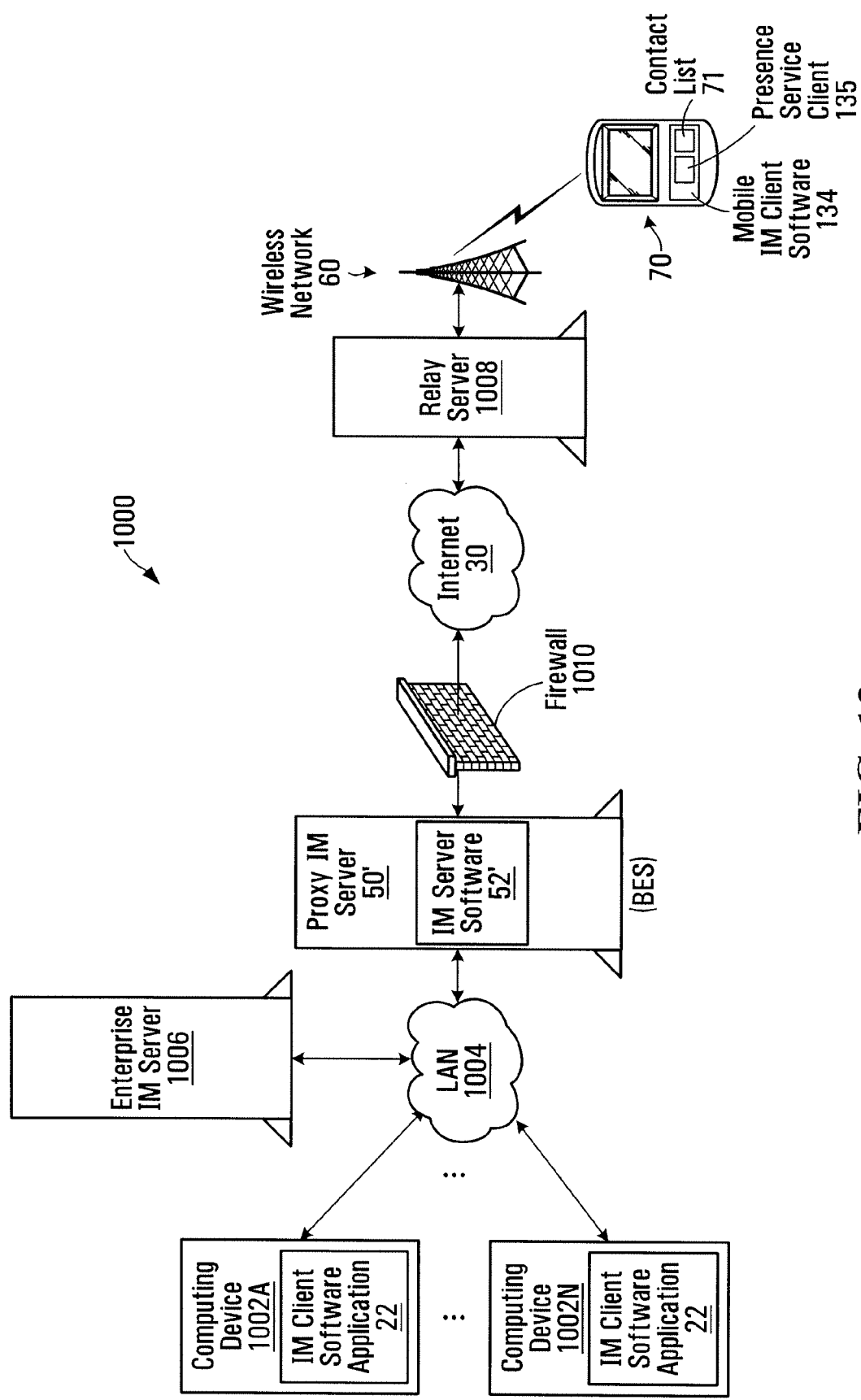
FIG. 12 illustrates a schematic diagram of an alternative IM system.

As illustrated in FIG. 12, IM system 1000 includes a number N of exemplary computing devices 1002A to 1002N executing client IM software 22, as described above. Devices 1002A to 1002N are connected to a secure local area network (LAN) 1004 that is administered by an enterprise. Also connected to LAN 1004 is an enterprise IM server 1006, such as IBM LOTUS SAMETIME™, NOVELL GROUPWISE® or MICROSOFT® Office Live Communications Server. The enterprise IM server provides IM service to users of devices 1002A to 1002N, as well as to remote users of wireless communication devices such as device 70 executing mobile IM client software application 134 with integrated presence service client 135. Further connected to LAN 1004 is a proxy IM server 50' executing proxy IM server software 52', which are similar to server 50 and software 52, described above. It is noted that, in the embodiment of FIG. 12, the proxy IM server 50 is effected on a BLACKBERRY ENTERPRISE SERVER™, not as shown in FIG. 1. The BES is generally responsible for monitoring the email accounts of users of wireless communication devices such as device 70 and "pushing" (forwarding) any received messages to the wireless communication devices by way of firewall 1010, Internet 30, relay server 1008 and wireless network 60. It may be desired to effect the proxy IM server software 52' at the BES in this scenario because the BES serves as a "choke point" for IM communications to and from the wireless communication device 70, and possibly other wireless communication devices. The proxy IM server software 52' may be referred to by the commercial name BlackBerry Collaboration Service software. Other components of server 50' are omitted for clarity.

As will be appreciated by those skilled in the art, modifications can be made to the above-described embodiments without departing from the essence of the invention. For example, wireless communication device 70 need not be a BlackBerry device using a proprietary RIM operating system. Other forms of wireless communication devices, such as WinCE or PalmOS operating system based devices, or possibly even devices executing operating system software that is not capable of multitasking, could be employed.

In some embodiments, the format of the HOLD and UNHOLD messages may be different from the formats shown in FIGS. 8 and 9. For example, the hold message may be part of a "login notification alert" sent by the IM client 134 to one or more IM contacts of interest.

It is not absolutely necessary for the Proxy IM Server software 52 to store the contact list 71. Since presence updates coming from the IM Server 40 may contain all information that the IM client software application 134 needs, the Proxy IM Server software 52 may simply maintain the buffered presence updates 54 without maintaining the contact list 71.

In the embodiments described above, when login notification is enabled in respect of an IM contact, no presence updates at all are buffered for that contact (whether login notifications or otherwise). In alternative embodiments, this setting may only prevent the buffering of login notifications. Other types of presence updates could feasibly still be buffered.

Fundamentally, it will be appreciated that the techniques described in the present disclosure are applicable to presence services and presence service clients used in any communication system, whether associated with instant messaging, VoIP calling, or otherwise. Presence service clients may be integrated with or otherwise associated with communication client software applications (such as IM clients or VoIP clients). Such communication clients software applications could be implemented in firmware or hardware instead of software, and thus may generically be referred to as "communication clients". Thus the term "communication client" may be used to refer to a software or firmware application executing at a wireless communication device or the wireless communication device itself. Generically, IM contacts may be referred to as "contacts" for such systems generally.

As well, it should be appreciated that the present disclosure applies to peer-to-peer embodiments in which no intermediate or central server exists. In such embodiments, presence updates may ordinarily be sent directly from any device at which a change in presence status has occurred to one or more other devices (peers) that have been configured to receive (e.g. at a presence service client) presence updates in respect of that device. In such embodiments, a first wireless communication device at which changes in presence status have occurred may buffer presence updates destined for a second (peer) wireless communication device upon receiving an indicator indicating that a communication client executing at or comprising the second device has become dormant. Upon receiving a further indicator indicating that the communication client has ceased being dormant, a set of buffered presence updates, possibly reconciled to eliminate redundant or obsolete information, may be sent to the second device.

Other modifications will be apparent to those skilled in the art and, therefore, the invention is defined in the claims.

What is claimed is:

1. A computer-implemented method comprising:
   at a proxy instant messaging server comprising at least one processor and memory in communication with said at least one processor, said server being in wireless communication with a plurality of communication clients executing at or comprising a like plurality of separate wireless communication devices, each of said communication clients being an instant messaging client:
   receiving an indicator, from one communication client of said plurality, that said communication client has become dormant, said indicator for causing said presence updates to be buffered at said proxy instant messaging server, wherein the communication client becoming dormant comprises presence information being undisplayable on a screen of the communication client;
   responsive to said receiving, buffering a set of presence updates destined for a presence service client associated with said communication client, each presence update of said set containing information regarding availability of at least one contact of a set of contacts for intercommunication via said communication client;
   receiving a further indicator indicating either that said communication client has ceased being dormant or that an event has occurred which shall cause said communication client to cease being dormant; and responsive to said receiving of said further indicator:
upon determining that multiple presence updates of said set are capable of reconciliation into a single presence update, reconciling said multiple presence updates into a single presence update and sending said set of presence updates containing said single presence update in place of said multiple presence updates to said presence service client via a wireless connection from said proxy instant messaging server to said presence service client so as to avoid using any bandwidth of said wireless connection for transmitting said multiple presence updates from said proxy instant messaging server to said presence service client.

2. The method of claim 1 wherein said indicator is a communication from said communication client.

3. The method of claim 1 wherein said further indicator is a communication from said communication client.

4. The method of claim 1 wherein said further indicator is a communication destined for said communication client that is different from a presence update.

5. The method of claim 4 wherein said communication client is an instant messaging client and wherein said communication is an instant message.

6. The method of claim 4 wherein said communication client is an instant messaging client and wherein said further indicator is a communication indicating that a contact of interest of said set of contacts has logged into an instant messaging service.

7. The method of claim 1 wherein the presence information being undisplayable comprises at least one of:
entry of the wireless communication device into a key-locked state or password-locked state in which no presence information is displayed at the wireless communication device;
activation of a screen saver at the wireless communication device which prevents presence information from being displayed at the wireless communication device;
activation of a power-saving mode at the wireless communication device which prevents presence information from being displayed at the wireless communication device; and
switching of said communication client from execution as a foreground process to execution as a background process such that no presence information is displayed at the wireless communication device.

8. A proxy instant messaging server comprising at least one processor and memory in communication with said at least one processor, said server being in wireless communication with a plurality of communication clients executing at or comprising a like plurality of separate wireless communication devices, each of said communication clients being an instant messaging client, said memory of said server storing instructions which, when executed by said at least one processor, adapt said server to:
receive an indicator from one communication client of said plurality, that said communication client has become dormant, said indicator for causing said presence updates to be buffered at said proxy instant messaging server, wherein the communication client becoming dormant comprises presence information being undisplayable on a screen of the communication client;
responsive to the receipt of said indicator, buffer a set of presence updates destined for a presence service client associated with said communication client, each presence update of said set containing information regarding availability of at least one contact of a set of contacts for intercommunication via said communication client;
receive a further indicator indicating either that said communication client has ceased being dormant or that an event has occurred which shall cause said communication client to cease being dormant; and
responsive to the receipt of said further indicator:
upon determining that multiple presence updates of said set are capable of reconciliation into a single presence update, reconcile said multiple presence updates into a single presence update and send said set of presence updates containing said single presence update in place of said multiple presence updates to said presence service client via a wireless connection from said proxy instant messaging server to said presence service client so as to avoid using any bandwidth of said wireless connection for transmitting said multiple presence updates from said proxy instant messaging server to said presence service client.

9. The proxy instance messaging server of claim 8 wherein the presence information being undisplayable comprises at least one of:
entry of the wireless communication device into a key-locked state or password-locked state in which no presence information is displayed at the wireless communication device;
activation of a screen saver at the wireless communication device which prevents presence information from being displayed at the wireless communication device;
activation of a power-saving mode at the wireless communication device which prevents presence information from being displayed at the wireless communication device; and
switching of said communication client from execution as a foreground process to execution as a background process such that no presence information is displayed at the wireless communication device.

10. A machine-readable medium storing instructions which, when executed by at least one processor of a proxy instant messaging server, adapt said server, which is in wireless communication with a plurality of communication clients executing at or comprising a like plurality of separate wireless communication devices, each of said communication clients being an instant messaging client, to:
receive an indicator , from one communication client of said plurality, that said communication client has become dormant, said indicator for causing said presence updates to be buffered at said proxy instant messaging server, wherein the communication client becoming dormant comprises presence information being undisplayable on a screen of the communication client;
responsive to the receipt of said indicator, buffer a set of presence updates destined for a presence service client associated with said communication client, each presence update of said set containing information regarding availability of at least one contact of a set of contacts for intercommunication via said communication client;
receive a further indicator indicating either that said communication client has ceased being dormant or that an event has occurred which shall cause said communication client to cease being dormant; and
responsive to the receipt of said further indicator:
upon determining that multiple presence updates of said set are capable of reconciliation into a single presence update, reconcile said multiple presence updates into a single presence update and send said set of presence updates containing said single presence update in place of said multiple presence updates to said presence service client via a wireless connection from said proxy instant messaging server to said presence service client so as to avoid using any bandwidth of said wireless connection for transmitting said multiple presence updates from said proxy instant messaging server to said presence service client.

11. The machine-readable medium of claim 10 wherein the presence information being undisplayable comprises at least one of:
   entry of the wireless communication device into a key-locked state or password-locked state in which no presence information is displayed at the wireless communication device;
   activation of a screen saver at the wireless communication device which prevents presence information from being displayed at the wireless communication device;
   activation of a power-saving mode at the wireless communication device which prevents presence information from being displayed at the wireless communication device; and
   switching of said communication client from execution as a foreground process to execution as a background process such that no presence information is displayed at the wireless communication device.

12. A computer-implemented method comprising, at a wireless communication device:
   upon detecting that a communication client executing at said wireless communication device has become dormant, said communication client for adapting said device to intercommunicate via a wireless connection with any of a set of user-specified contacts and having an associated presence service client for receiving presence updates via said wireless connection regarding the availability of any of said set of contacts for intercommunication via said communication client, sending a communication for causing said presence updates to be buffered at a separate computing device, wherein the communication client becoming dormant comprises presence information being undisplayable on a screen of the communication client; and
   upon detecting that said communication client has ceased being dormant:
      sending a further communication for causing said separate computing device to send said set of buffered presence updates; and
      receiving a set of buffered presence updates at said presence service client from said separate computing device via said wireless connection.

13. The method of claim 12 wherein said presence information being undisplayable comprises at least one of:
   entry of the wireless communication device into a key-locked state or password-locked state in which no presence information is displayed at the wireless communication device;
   activation of a screen saver at the wireless communication device which prevents presence information from being displayed at the wireless communication device;
   activation of a power-saving mode at the wireless communication device which prevents presence information from being displayed at the wireless communication device; and
   switching of said communication client from execution as a foreground process to execution as a background process such that no presence information is displayed at the wireless communication device.

14. The method of claim 12 wherein said communication client is an instant messaging (IM) client and wherein said communication client ceasing to be dormant comprises:
   presence information becoming displayable at said wireless communication device;
   user interaction with said IM client; or
   receipt of an instant message or a login notification regarding a contact at said IM client.

15. A wireless communication device comprising at least one processor and memory in communication with said at least one processor, said memory storing instructions which, when executed by said at least one processor, adapt said device to:
   upon detecting that a communication client executing at said wireless communication device has become dormant, said communication client for adapting said device to intercommunicate via a wireless connection with any of a set of user-specified contacts and having an associated presence service client for receiving presence updates via said wireless connection regarding the availability of any of said set of contacts for intercommunication via said communication client, send a communication for causing said presence updates to be buffered at a separate computing device, wherein the communication client becoming dormant comprises presence information being undisplayable on a screen of the communication client; and
   upon detecting that said communication client has ceased being dormant:
      send a further communication for causing said separate computing device to send said set of buffered presence updates; and
      receive a set of buffered presence updates at said presence service client from said separate computing device via said wireless connection.

16. The wireless communication device of claim 15 wherein said communication client is an instant messaging (IM) client.

17. The wireless communication device of claim 15 wherein the presence information being undisplayable comprises at least one of:
   entry of the wireless communication device into a key-locked state or password-locked state in which no presence information is displayed at the wireless communication device;
   activation of a screen saver at the wireless communication device which prevents presence information from being displayed at the wireless communication device;
   activation of a power-saving mode at the wireless communication device which prevents presence information from being displayed at the wireless communication device; and
   switching of said communication client from execution as a foreground process to execution as a background process such that no presence information is displayed at the wireless communication device.

18. A machine-readable medium storing instructions which, when executed by at least one processor of a wireless communication device, adapt said device to:
   upon detecting that a communication client executing at said wireless communication device has become dormant, said communication client for adapting said device to intercommunicate via a wireless connection with any of a set of user-specified contacts and having an associated presence service client for receiving presence updates via said wireless connection regarding the availability of any of said set of contacts for intercommunication via said communication client, send a communication for causing said presence updates to be buffered at a separate computing device, wherein the communication client becoming dormant comprises presence information being undisplayable on a screen of the communication client; and upon detecting that said communication client has ceased being dormant:

send a further communication for causing said separate computing device to send said set of buffered presence updates; and receive a set of buffered presence updates at said presence service client from said separate computing device via said wireless connection.

19. The machine-readable medium of claim 18 wherein said communication client is an instant messaging (IM) client.

20. The machine-readable medium of claim 18 wherein the presence information being undisplayable comprises at least one of:

entry of the wireless communication device into a key-locked state or password-locked state in which no presence information is displayed at the wireless communication device;

activation of a screen saver at the wireless communication device which prevents presence information from being displayed at the wireless communication device;

activation of a power-saving mode at the wireless communication device which prevents presence information from being displayed at the wireless communication device; and switching of said communication client from execution as a foreground process to execution as a background process such that no presence information is displayed at the wireless communication device.

\* \* \* \* \*